United States Patent
Oisel et al.

(10) Patent No.: US 8,326,900 B2
(45) Date of Patent: Dec. 4, 2012

(54) DEVICE AND METHOD FOR CREATING SUMMARIES OF MULTIMEDIA DOCUMENTS

(75) Inventors: Lionel Oisel, Pleumeleuc (FR); Ewa Kijak, Dinge (FR); Francois Le Clerc, Rennes (FR)

(73) Assignee: Thomson Licensing, Boulogne, Billancourt (FR)

( * ) Notice: Subject to any disclaimer, the term of this patent is extended or adjusted under 35 U.S.C. 154(b) by 1123 days.

(21) Appl. No.: 10/584,647

(22) PCT Filed: Jan. 4, 2005

(86) PCT No.: PCT/EP2005/050023
§ 371 (c)(1),
(2), (4) Date: Jun. 26, 2006

(87) PCT Pub. No.: WO2005/069165
PCT Pub. Date: Jul. 28, 2005

(65) Prior Publication Data
US 2009/0144608 A1 Jun. 4, 2009

(30) Foreign Application Priority Data
Jan. 6, 2004 (FR) .................................. 04 00069

(51) Int. Cl.
*G06F 17/30* (2006.01)
(52) U.S. Cl. ........................ 707/913; 707/727; 725/10
(58) Field of Classification Search ........... 707/999.006, 707/999.007, 999.107, 727, 913; 725/9, 725/10, 16
See application file for complete search history.

(56) References Cited

U.S. PATENT DOCUMENTS

| | | | |
|---|---|---|---|
| 6,557,042 B1 * | 4/2003 | He et al. ........................ 709/231 |
| 7,003,792 B1 * | 2/2006 | Yuen ................................ 725/46 |
| 7,260,823 B2 * | 8/2007 | Schlack et al. ..................... 725/9 |
| 7,333,712 B2 * | 2/2008 | Jeannin et al. ................. 386/343 |
| 7,370,342 B2 * | 5/2008 | Ismail et al. ..................... 725/46 |
| 7,590,993 B1 * | 9/2009 | Hendricks et al. .............. 725/35 |
| 7,624,346 B2 * | 11/2009 | Miyamori ...................... 715/719 |
| 2002/0152267 A1 * | 10/2002 | Lennon .......................... 709/203 |
| 2003/0081673 A1 * | 5/2003 | Peng et al. .................. 375/240.2 |
| 2004/0177370 A1 * | 9/2004 | Dudkiewicz .................... 725/46 |
| 2006/0156326 A1 * | 7/2006 | Goronzy et al. ................. 725/13 |
| 2006/0212900 A1 * | 9/2006 | Ismail et al. ..................... 725/34 |
| 2006/0212904 A1 * | 9/2006 | Klarfeld et al. ................. 725/46 |
| 2008/0092168 A1 * | 4/2008 | Logan et al. ..................... 725/44 |

OTHER PUBLICATIONS

K. Masumitsu et al: "Video summarization using reinforcement learning in eigenspace" Proceedings of the International Conference on Image Processing. ICIP 2001, vol. 2, Sep. 10, 2000-Oct. 10, 2001, pp. 267-270.

(Continued)

Primary Examiner — Leslie Wong
(74) Attorney, Agent, or Firm — Jeffrey D. Carter

(57) ABSTRACT

The invention relates to a device (1) and a method for creating summaries of multimedia documents, the device comprising a storage means and means enabling a user to view a multimedia document. According to the invention, the device comprises means of automatically weighting multimedia documents stored in the storage means according to the frequency with which the different stored documents are viewed by said user, means of creating a summary of the multimedia documents stored on the storage means according to the weighting assigned to each multimedia document.

7 Claims, 2 Drawing Sheets

OTHER PUBLICATIONS

Figure 1:
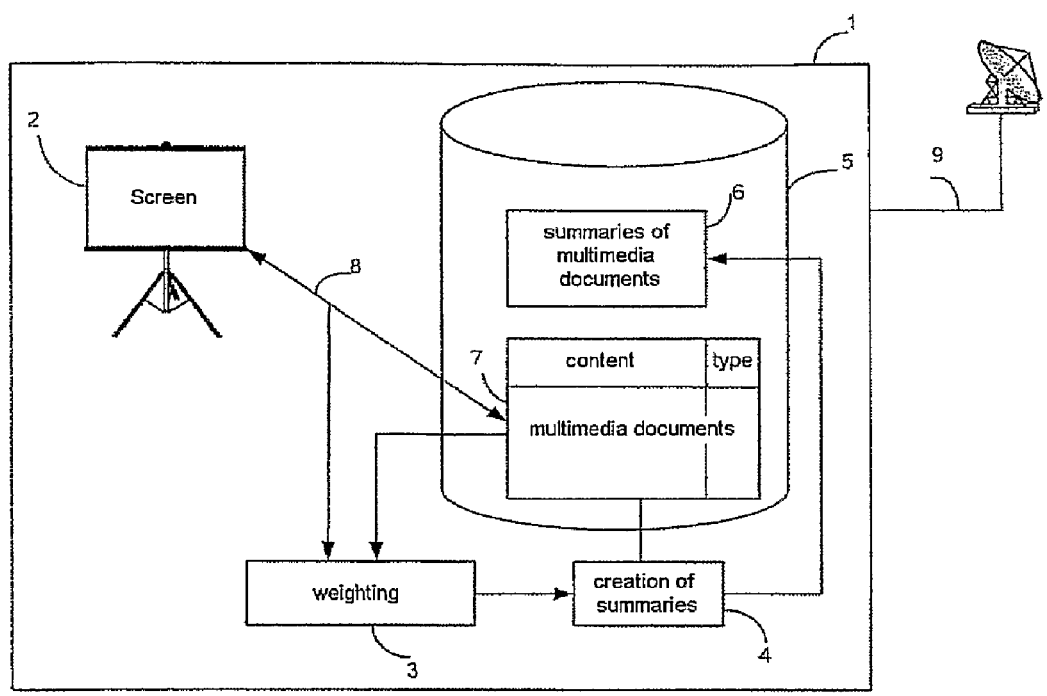

K. Masumitsu et al: "Meta-data framework for constructing individualized video digest", Proceedings of the International Conference on Image Processing. ICIP 2001, Oct. 7-10, 2001, pp. 390-393.

N. Babaguchi et al: "Generation of personalized abstract of sports video" Proceedings of the International Conference on Multimedia and Expo, Aug. 22-25, 2001, pp. 800-803.

W. Kwan et al: "An intelligent agent for multimedia", Canadian Conference on Electrical and Computer Engineering, Sep. 5, 1995-Oct. 10, 2001, pp. 594-597.

Y. Rui et al: "Automatically extracting highlights for TV baseball programs" Proceedings of the Eighth ACM International Conference on Multimedia, Oct. 30, 2000, pp. 105-115.

Search Report Dated Apr. 19, 2005.

* cited by examiner

DEVICE AND METHOD FOR CREATING SUMMARIES OF MULTIMEDIA DOCUMENTS

This application claims the benefit, under 35 U.S.C. §365 of International Application PCT/EP05/050023, filed Jan. 4, 2005, which was published in accordance with PCT Article 21(2) on Jul. 28, 2005 in English and which claims the benefit of French patent applications No. 0400069, filed Jan. 6, 2004.

The invention relates to a device and a method for creating summaries of multimedia documents.

The context of the present invention is that of domestic multimedia servers, and, generally, all appliances designed to display audiovisual transmissions received from a broadcast network. These days, a user of such equipment can obtain large quantities of audiovisual information. The user therefore has little time to devote to each transmission and often prefers to scan them by viewing a summary. Furthermore, a user often has preferences as to the type of multimedia programme that he watches. From the moment he wants to look up the programmes stored on his server, he therefore has an interest in being able to view a sequence of programmes offered automatically by his multimedia server according to his tastes and, if possible, initially, to view summaries of these programmes. He can then, based on the summary, choose to watch an entire programme.

Furthermore, broadcasts such as football matches have moments that are more interesting than others, such as goals or the best movements. A user having little time available may want to view only a selected summary of the most interesting sequences. Television programme broadcasters can transmit multimedia summaries corresponding to certain transmissions that they broadcast. These summaries are, for example, trailers of broadcast films. However, this requires the broadcaster to compile said summaries and does not always match up to the expectations of the users.

The document entitled "video personalization system for usage environment" published in 2002 in the review "proceedings of the SPIE—The international Society for Optical Engineering", in volume 4862, pages 249-260, proposes a system of personalization enabling a user to formulate a request to a server in order to receive a multimedia document. The user has to send his preferences in terms of content to the server. The user sends his preferences to the server which returns to the user summaries of the documents it has that match the user's preferences. Such a system does not automatically create the summaries, but requires interaction with the user and is aimed primarily at client-server devices.

One object of the present invention is to be able to provide the user having a library of multimedia documents with summaries of audio-visual transmissions, automatically, according to his tastes.

To this end, the present invention proposes a device for creating summaries of multimedia documents comprising a storage means and means enabling a user to view a multimedia document.

According to the invention, the device comprises:
 means of automatically weighting multimedia documents stored in the storage means according to the frequency with which the different stored documents are viewed by said user,
 means of creating a summary of the multimedia documents stored on the storage means according to the weighting assigned to each multimedia document.

Thus, the user does not transmit his preferences to the device. His preferences are observed by the device according to the number of times the stored documents are accessed. In this way, the device automatically creates summaries of the stored documents according to how many times the documents are accessed, and therefore of the preferred documents, since a user will more frequently access the documents that he prefers and rarely access the documents that he does not like.

According to a preferred embodiment, the means of creating a summary of the stored multimedia documents create a summary for the documents for which the weighting coefficient is greater than a predefined threshold.

In this way, it is possible to create a summary for the most frequently accessed documents. This can be used to save space on the storage means by not creating summaries for the infrequently accessed documents.

According to a preferred embodiment, each multimedia document having a type relating to the content of said document associated with it, said device comprises means of weighting the documents according to their type.

This can be used to weight documents that are not accessed but with a type that is the same as that of other documents that have been accessed. In this way, it is not necessary to access all the documents for them to be weighted. They are weighted according to the access to documents of the same type.

According to a preferred embodiment, the device comprises means of:
 dividing each multimedia document into scenes,
 weighting each scene of said multimedia document.

Preferably, the means of creating a summary of the multimedia documents create a summary according to the weighting assigned to each scene of said document.

Thus, the user will be offered summaries containing the most important scenes of the document. Advantageously, the most important scenes will be represented by longer durations than the less significant scenes.

According to a preferred embodiment, the means of creating a summary of the stored multimedia documents adapt the duration of the summary according to the weighting assigned to each document and to each scene of the documents.

The invention also relates to a method of creating summaries of multimedia documents in a device comprising a storage means, said method comprising the steps of:
 viewing, enabling a user to view a multimedia document,
 weighting the multimedia documents stored in the storage means according to the frequency with which the different documents are viewed by said user,
 creating a summary of the multimedia documents stored on the storage means according to the weighting assigned to each document.

Figure 2:
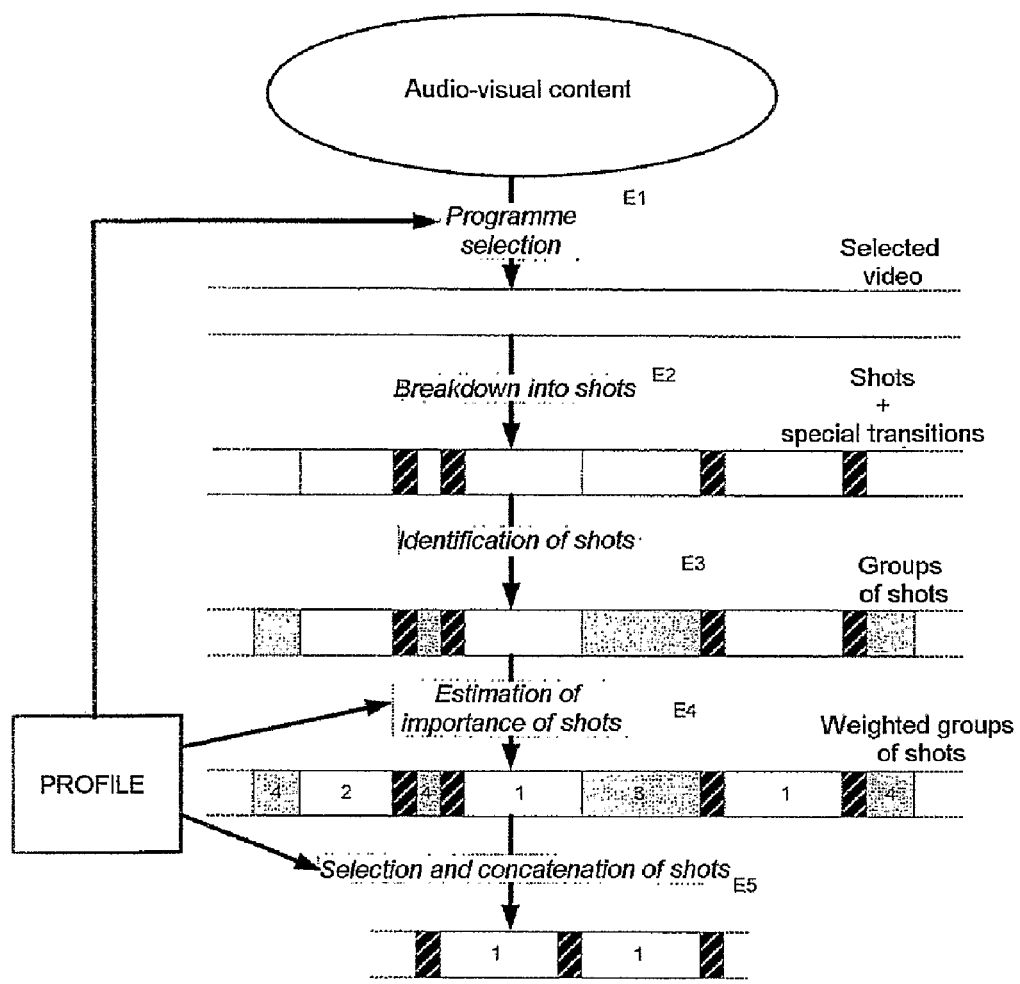

The invention will be better understood and illustrated through advantageous embodiments and implementations, by no means limiting, with reference to the appended figures in which:

FIG. 1 represents a device for creating multimedia document summaries according to the invention, FIG. 2 represents an embodiment of a method according to an embodiment of the invention taking into account the preferences of the user at the various stages of creation of the summary.

A device 1 for creating summaries according to a preferred embodiment is described in FIG. 1.

The device 1 comprises a viewing means 2 represented conventionally by a television screen.

The television 2 enables a user to view the content stored on the storage means 5. The storage means 5 is a hard disk but can also be a DVD, an optical disk, a rewriteable CD-ROM or any permanent storage means.

The hard disk 5 is used to store contents received via a satellite antenna 9, or by terrestrial means in other embodiments. It is also used to store multimedia documents received by other means, not represented in FIG. 1, by being connected to other communication means such as the Internet. The hard disk 5 is connected to the television 2 via a link 8 which can be a conventional communication bus or any other means of connection known to a person skilled in the art. Preferably, the means 5, 3 and 4 are contained in a digital set-top box. The modules represented are functional units, which may or may not correspond to physically distinguishable units. For example, these modules or some of them may be combined in a single component, or constitute features of a particular software package. Conversely, some modules may, if appropriate, be made up of separate physical entities.

The hard disk 5 also comprises multimedia documents 7 and summaries 6 of the multimedia documents 7.

The device 1 also comprises weighting means 3, linked to a summary creation module 4.

The weighting means 3 are connected to the communication bus between the television 2 and the hard disk 5. The weighting means observe communications between the television 2 and the hard disk 5. This provides a knowledge of the type of programme viewed by the user and is used to draw up an ordered list of the multimedia programmes watched. This therefore provides automatic knowledge of the user's preferences. The weighting means 3 use the data conveyed on the bus to ascertain the files accessed. The weighting means 3 can also, in other embodiments, use information present on the hard disk 5, or a file management system (not represented), to generate stored file access statistics.

The weighting means 3 perform an initial weighting of the documents 7 according to the frequency of access to the documents 7 stored on the hard disk 5. Each multimedia document 7 present on the hard disk can be classified according to a particular type. In practice, it may be a documentary, a sporting event, a film, a variety show, an information magazine, etc. The stored documents can therefore be classified in categories, each representative of a type. The classification in the different categories is done manually by the user when he decides to store a multimedia document on the hard disk 5. The device 1 prompts him, via a user interface available on the television 2, to assign a category to his document.

In other embodiments, the classification can also be done automatically if the programmes received contain information enabling them to be characterized. This is possible in particular in the context of the DVB SI (Digital Video Broadcast—Service Information) standard, since a field is available representative of the content of the document.

The documents of a particular type are also classified in subtypes in the following way. Sporting documents are classified according to the sports: football, tennis, gymnastics, athletics, etc. Films are classified according to the actors or according to a genre (violent, comic, etc.), etc. Such a classification can also be done manually or even automatically as described previously for the classification in types.

The term "type" is therefore understood to mean a breakdown according to one or more hierarchical levels, of documents of the same type (sporting events, films, documentaries) that can then be further classified in subcategories according to their specific content.

The means 3 generates statistics on the types of documents accessed by the user. It thus establishes a weighting of the documents present on the hard disk 5. If the user frequently accesses football matches, then football matches will have a high weighting. If he accesses documentaries only infrequently, then documentaries will be assigned a low weighting.

The multimedia documents 7 stored in the device 1 are, then, weighted automatically and dynamically according to the user. It is also possible in other embodiments to identify the user and assign a different weighting to the multimedia documents 7 according to the current user, since all the users have different preferences.

The weighting means 3 also perform a second weighting of the multimedia documents 7 stored on the hard disk 5.

The stored multimedia documents 7 are preferably divided up into shots (or scenes). A method of segmentation into shots is disclosed in the French patent filed on Apr. 17, 2000 in the name of Thomson Licensing S. A and entitled "procédé de détection de changement de plans dans une succession d'images vidéo" (method of detecting changes of shot in a succession of video pictures).

Some documents comprise characteristic scenes that are more interesting to the user. This proves particularly relevant in the context of sporting programmes in which the scores are the highlights of a match. The weighting means therefore weight each scene according to its importance. This weighting can also take into account the preferences of the user. In practice, certain users may, in a film for example, prefer scenes of violence and some may prefer calmer scenes.

To do this, the weighting means 3 analyse the way in which the user views the documents contained on the hard disk 5, the documents having previously been segmented into shots as described previously. In practice, if the user uses the fast forward mode on certain types of scenes, this means that he considers these scenes to be of low importance whereas if he watches them at normal or slow speed (as is the case in football matches, for example), these are important scenes for him.

In another embodiment, the weighting means 3 also use viewing modes such as normal play, fast forward, slow motion, not on the basis of the viewing modes of the user but according to what is stored on the hard disk 5. In practice, the broadcasters normally transmit, at least for sporting events, the highlights of the event, in slow motion, and the pictures in slow motion mode are therefore stored with the pictures in normal mode on the hard disk 5.

In another embodiment, a user interface, not represented, can be added to the device 1 and be used by the user to weight each scene that he views.

The weighting module 3 transmits the weighting coefficients to the summary creation module 4. The summary creation module 4 also receives the multimedia documents 7. It generates the summaries 6 according to weighting coefficients of each document 7 and of each scene of the document.

The module 4 takes account of the first weighting coefficients to compute the length of the summary 6. If the weighting coefficients are high, then the summary will be longer.

The module 4 creates summaries 6 only for the documents 7 for which the weighting coefficients are not zero. It does not create summaries for the documents 7 of a type that is never accessed by the user.

In other embodiments, it is also possible to generate summaries for all the documents 7 stored on the hard disk 5, or for the documents 7 for which the weighting is greater than a predefined threshold.

The summary creation module 4 acts as and when documents 7 are stored on the hard disk 5. When a new multimedia document 7 is stored on the hard disk 5, the weighting module 3 assigns it a weighting according to its type and the weightings assigned to documents of the same type. If this document is of a new type, a type not corresponding to any document stored on the hard disk 5, then the weighting module 3 assigns it a zero weighting. The weighting assigned to this document will be modified according to the times the user accesses either any other document of the same type recently stored or this document. In practice, if this document is a particular favourite of the user, then this document will be assigned a weighting higher than the other documents of the same type. The weighting is therefore made according to the documents of the same type but primarily according to the frequency of access to the document itself.

It is also possible, in other embodiments, to create summaries at the request of the user. This is a way of avoiding saturating the hard disk 5. The user then transmits a request to the device 1 asking for summaries, not specifying what he wants. The device 1 then sends him the summaries according to the weighting assigned to the different documents, the summaries having been generated previously or being generated at the time of the request.

The user uses the summaries constructed by the summary creation module 4 to quickly view the content of his hard disk 5. He can also view the important scenes of the last football match that he watched. In this way, he obtains summaries suited to his preferences.

FIG. 2 represents the different possibilities of taking into account the preferences of the user and describes an exemplary embodiment of the method according to the invention.

The user's preferences can be applied as indicated in the description of FIG. 1 on creating summaries of a selection of stored programmes or on all the stored programmes. In practice, it is advantageous to create summaries only for the documents that might potentially be accessed by the user, identified by the fact that they belong to a frequently accessed document type.

The user's preferences can also be applied when estimating the importance of the shots that will be used in the summary 6. The weighting means 3 described in FIG. 1 take account of the shots representing important moments for the user or characteristics for the type of programme, for example a goal for a football match.

The user's preferences can also be applied in creating the summary itself as indicated in the description of the weighting means 2 in FIG. 1. The weighting means 2 take account of the user's preferences by weighting the documents stored on the hard disk 5 according to the frequency with which these documents and documents of the same type are accessed. Thus, the shots are concatenated and their duration is adjusted according to the preferences of the user.

In step E1, the device selects the documents 7 for which a summary 6 is created. As indicated previously, the device implementing the method creates summaries only for the documents for which the weighting coefficient is not zero, and therefore for documents potentially of interest to the user.

Steps E2 to E5 are performed for each document selected in step E1.

Then, in step E2, the documents are divided into shots according to the methods described previously when describing FIG. 1.

In step E3, the shots are identified relative to a reference structure known elsewhere and linked to the nature of the document concerned. For example, if a document is identified as a tennis match, the theoretical structure of the tennis match is automatically realigned on the document, each portion of the document then being linked to a reference scene. The set of reference structure models is stored permanently on the hard disk 5 or can be loaded on a server on request via the use of an Internet link. A method for recognizing the structure of a video document and more specifically the structure of a sporting event is explained in the paper by L. Xie, S-F Chang, A. Divakaram and H. Sun entitled "Structure analysis of soccer video with hidden Markov models", Proc. of the Intl. Conf. on Acoustic, Speech and Signal Processing, Orlando, Fla., USA, May 13-17, 2002. Each of the game and non-game classes is modelled there by a set of hidden Markov models.

In step E4, the shots are weighted according to their importance to the user. The numbers in FIG. 2 correspond to the weighting assigned to each shot of the selected video document.

In step E5, the shots with a weighting higher than a certain threshold are selected. The method concatenates the selected shots and generates the summary according to the selected shots and the weighting coefficients of the selected shots The shots with a high weighing coefficient have a longer duration than the shots with a low weighting coefficient, in other words, more pictures are kept for the shots with a high weighting coefficient than for the shots with a low weighting coefficient.

The invention claimed is:

1. A device, comprising:
   a storage unit that stores multimedia documents;
   a viewing unit that enables a user to view the multimedia documents stored on the storage unit;
   a weighting module that automatically assigns a weight to each of the multimedia documents stored on the storage unit according to a number of times each of the multimedia documents is viewed by the user; and
   a summary creation module that creates a summary of each of the multimedia documents stored on the storage unit according to the weight assigned to each of the multimedia documents, wherein each of the summaries summarizes contents of a corresponding multimedia document and a duration of each of the summaries is based on the weight assigned to the corresponding multimedia document and such that the summary of one of the multimedia documents having a higher weight is longer than the summary of another one of the multimedia documents having a lower weight.

2. The device according to claim 1, wherein the summary creation module creates the summary of each of the multimedia documents stored on the storage unit for which the weight assigned to each of the multimedia documents is greater than a predefined threshold.

3. The device according to claim 1, wherein each one of the multimedia documents has a type relating to the contents of the multimedia document, and the weighting module additionally assigns a weight to each of the multimedia documents according to the type of the multimedia document.

4. The device according to claim 1, wherein the device additionally divides each of the multimedia documents into scenes and the weighting module additionally assigns a weight to each of the scenes of the multimedia documents.

5. The device according to claim 4, wherein the summary creation module creates the summary of each of the multimedia documents stored on the storage units according to the weight assigned to each of the scenes of the multimedia documents.

6. The device according to claim 1, wherein the storage unit additionally stores the summaries.

7. A method, comprising steps of:
   enabling a user to access a plurality of multimedia documents stored on a storage device;
   automatically assigning a weight to each of the multimedia documents stored on the storage device according to a number of times each of the multimedia documents is accessed by the user; and
   creating a summary of each of the multimedia documents stored on the storage device according to the weight assigned to each of the multimedia documents, wherein each of the summaries summarizes contents of a corresponding multimedia document and a duration of each of the summaries is based on the weight assigned to the corresponding multimedia document and such that the summary of one of the multimedia documents having a higher weight is longer than the summary of another one of the multimedia documents having a lower weight.

* * * * *